United States Patent [19]
Juan

[11] Patent Number: 5,239,221
[45] Date of Patent: Aug. 24, 1993

[54] COMBINED STATOR FOR A CARBON BRUSH MOTOR

[76] Inventor: Hsiu-Ching Juan, No. 273-1, Shih Tzu Lai, Shih Hu Tsun, Ta Nei Hsiang, Tainan Hsien, Taiwan

[21] Appl. No.: 955,441

[22] Filed: Oct. 2, 1992

[51] Int. Cl.$^5$ ............................................. H02K 1/12
[52] U.S. Cl. ...................... 310/258; 310/42; 310/45; 310/89; 310/259
[58] Field of Search ............... 310/254, 257, 259, 42, 310/45, 179, 91, 89, 216, 192, 194, 258

[56] References Cited

U.S. PATENT DOCUMENTS

| | | | |
|---|---|---|---|
| 2,251,673 | 8/1941 | Gillen | 310/89 UX |
| 2,560,560 | 7/1951 | Doherty | 310/254 UX |
| 2,712,084 | 6/1955 | Bridenbaugh | 310/254 UX |
| 3,156,838 | 11/1964 | Winther | 310/42 |
| 3,644,767 | 2/1972 | Kasargod | 310/254 |
| 4,322,647 | 3/1982 | Neroda | 310/42 |
| 4,623,811 | 11/1986 | Nystuen | 310/192 |
| 4,883,997 | 11/1989 | De Cesare | 310/179 |
| 4,968,911 | 11/1990 | Denk | 310/42 |
| 4,990,809 | 2/1991 | Artus | 310/254 |
| 5,015,904 | 5/1991 | Kleemann | 310/45 |

Primary Examiner—R. Skudy
Attorney, Agent, or Firm—Morton J. Rosenberg; David I. Klein

[57] ABSTRACT

A combined stator for a carbon brush motor is provided. The combined stator includes two half stator yokes combined together and secured tightly with a securing frame formed by two U-shaped frame members. The two half stators are each provided with two semi-circular spaced apart and parallel insulating members with a respective coil disposed in the space therebetween, the coil being wound therein by a winding machine before the two half stators are secured together. Each of the two frame members is provided with a pair of projections formed on each of its opposing sides for receipt within recess openings formed in end portions of each stator half to thereby interlock the stator halves in a stator assembly by engagement with the frame members.

1 Claim, 3 Drawing Sheets

COMBINED STATOR FOR A CARBON BRUSH MOTOR

BACKGROUND OF THE INVENTION

A conventional stator having two or more polarities shown in FIG. 3 comprises a stator 10, usually made of silicon steel plates, and two coil 20 in deposited in respective coil holes 10 formed in the stator 10. The coils are usually hand wound, in prior art systems, to be fit into the coil holes 101.

This manufacturing process of the conventional stator has drawbacks as follows:

1. The coils cannot be made tight enough, owing to manual winding operation, and the material for the coil may then be wasted;
2. Manual winding of coils takes tie, and each manufacturing operation is impossible to speed up;
3. Quality of the coils cannot be kept at a consistent level, because of the manual winding operation; and,
4. The stator is mostly made of laminated silicon steel, by means of pressing, so the coils are not easily fit into the coil holes.

SUMMARY OF THE INVENTION

This invention has been devised to improve a conventional stator for a carbon brush motor, aiming to have advantages listed below.

1. The stator is comprised of two half stators, so separate half stators can be wound with a respective coil quickly by a winding machine. In addition, machine wound coils can be quite tight, saving material.
2. A winding machine used in winding coils on separate half stators can be simple, so investment for machine equipment can be reduced substantially, thereby enabling the motor products to compete in the market.
3. The central opening formed by the combine stator, for receipt of the rotor, can be made to minimize the gap between the stator and the rotor, thereby reducing loss of magnet force and increasing rotating power.
4. A securing frame is provided to secure the combined stator in a stabilized condition by means of projections fitting in recessed holes provided in the two half stators, indirectly assisting a rotor in smooth rotation without giving rise to drawbacks of wear and tear and swaying of rotating components.

BRIEF DESCRIPTION OF THE DRAWINGS

The invention will be better understood by reference to the accompanying drawings, wherein.

DETAILED DESCRIPTION OF THE PREFERRED EMBODIMENTS

Figure 1:
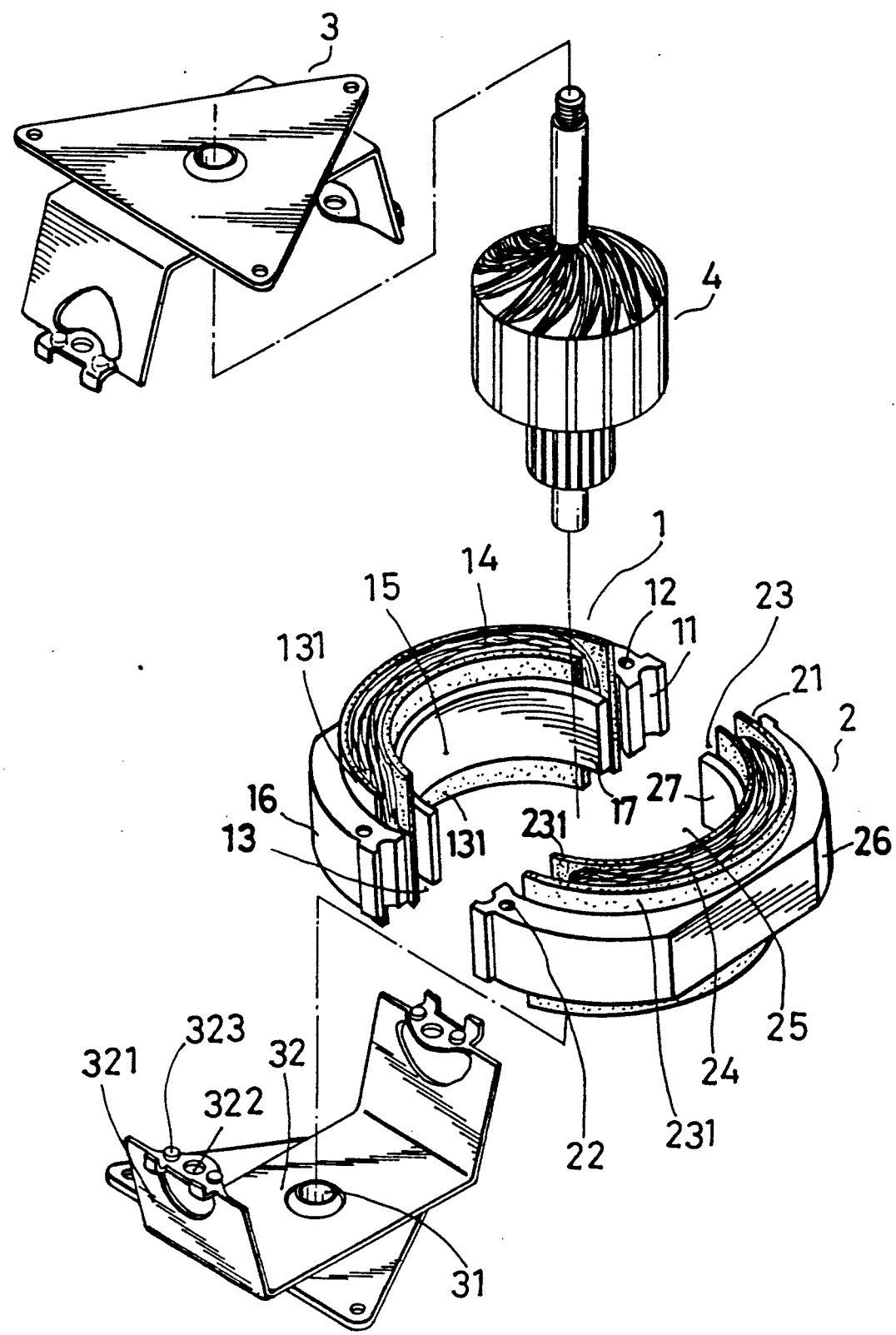
FIG. 1 is an exploded perspective view of a combined stator for a carbon brush motor in the present invention.
Figure 2:
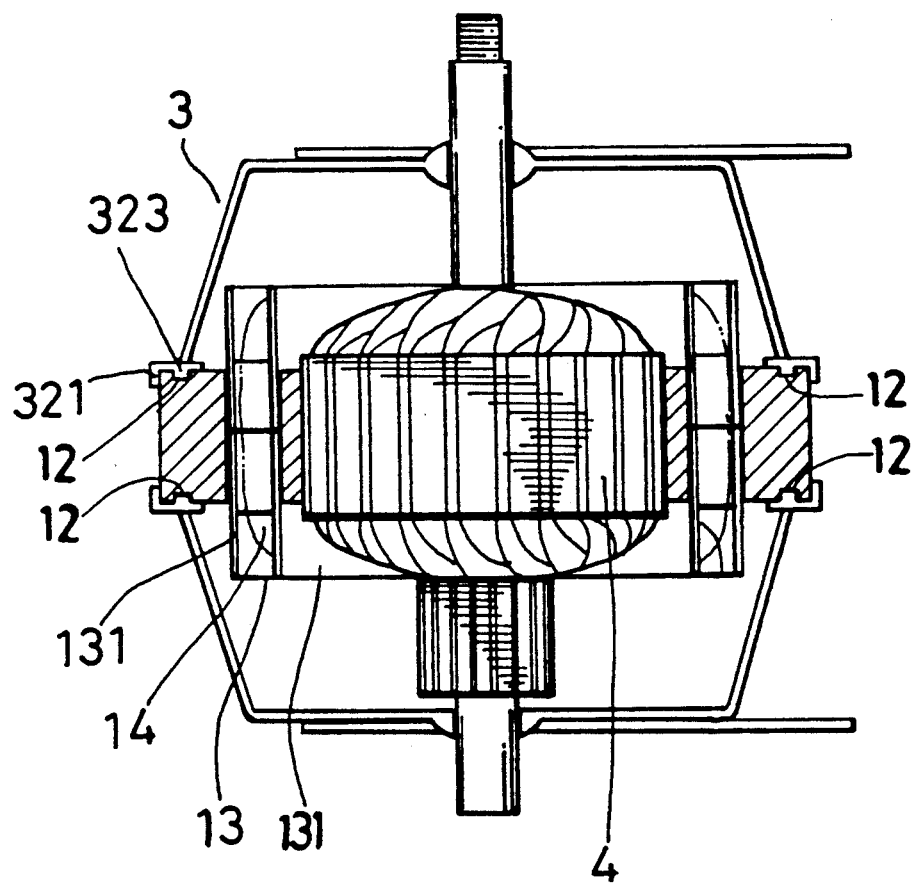
FIG. 2 is a cross-sectional view of a combined stator for a carbon brush motor in the present invention; and, FIG. 3 is an exploded perspective view of a conventional stator for a carbon brush motor.
Figure 3:
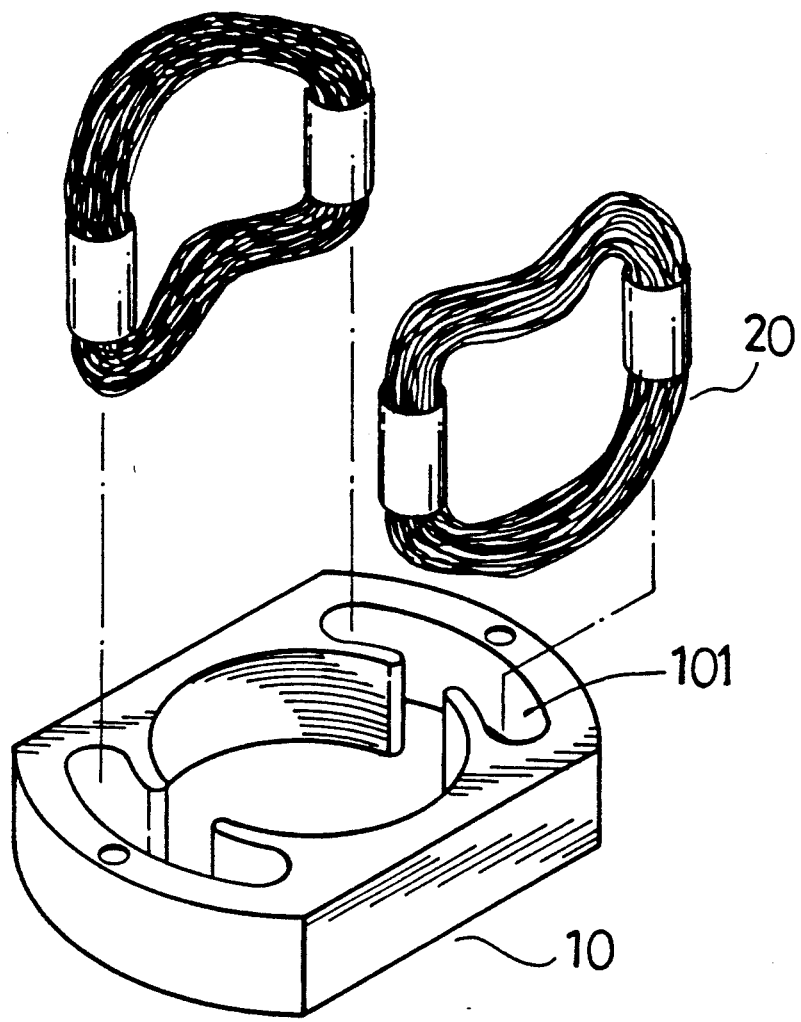

A combined stator for a carbon brush motor in the present invention, as shown in FIGS. 1 and 2, comprises a left half stator 1, a right half stator 2 and a securing frame 3 secured together. Each half stator 1, 2 is defined by a semi-circular yoke 16, 26 having a pole portion 17, 27, respectively.

The left and the right half stator, 1, 2, are symmetrically formed, each having a half screw hole 11, 21 respectively on opposing ends thereof. A pair of recess openings 12, 22 having predetermined depths are formed adjacent the half screw holes 11, 21 on opposing sides of each end of each half stator 1, 2. A semi-circular groove 13, 23 is disposed between the outer portion of the yole 16, 26 of each stator half 1, 2 and the spaced parallel pole portion 17, 27, wherein there is disposed two semi-circular spaced apart parallel insulating members 131, 131, 231 and 231. A coil 14, 24 is wound in the hollow space between the two insulating members 131, 131 and 231, 231 . A semi-circular opening 15, 25 abutting the pole portions 17, 27 forms a central opening when the two stator halves are combined, for a rotor 4 to be rotatably received therein.

The securing frame 3 consists of two half frame members, each respectively having a U-shaped body. A central hole 31 is formed in an intermediate portion 32 of each frame member for receiving a rotor shaft therein. Two bent side portions of 321 extending from opposing sides of the intermediate portion of each frame member are provided, and each side portion 321 is formed with a through hole 322. Each side portion 321 further includes two circular projections 323 disposed on opposing sides of the hole 322. The side portions 321 of each half frame clampingly securing the yokes 16, 26 of both left and right half stators 1,2 together, with the projections 323 engaged within respective recess openings 12 and the through holes 322 in line with the screw holes 11, 21 for interlocking the stator halves and securing the frame 3 tightly thereto.

When assembled, the insulating members 131, 231 are fixed in the semi-circular grooves 13, 23, with the coils 14, 24 having been formed directly and quickly between the insulating members 131, 231 by a winding machine. As the stator is divided into two separate stators 1, 2, winding the coils 14, 24 between the insulating members can be accomplished with speed and the tension of the coil windings are also improved over that achieved by manual winding. Thus, the speed and quality of stator production can be improved. Subsequent to coil winding, both the left and the right half stators are combined together and secured by the securing frame 3 as described above.

While the preferred embodiments of the invention have been described above, it will be recognized and understood that various modifications may be made therein and the appended claims are intended to cover all such modifications which may fall within the spirit and scope of the invention.

what is claimed is:

1. A combined stator for a carbon brush motor, comprising:

a pair of stator yokes matingly joined with respective end portions contiguously interfaced to form a stator having an annular contour, each of said pair of stator yokes having a substantially semi-circular contour, each of said stator yokes having a pole portion disposed in spaced relation from an outer portion thereof, each of said stator yokes having a pair of semi-cylindrical recesses respectively formed in opposing first and second end portions thereof for forming a pair of first through openings in said stator, each of said stator yokes having four circular recess openings formed thereon, a first pair of said four circular recess openings being disposed adjacent said first end portion on opposing sides thereof, a second pair of said four circular recess openings being disposed adjacent said second end portion on opposing sides thereof, a pair of coils, each of said pair of coils being machine wound on a respective one of said pair of stator yokes between a pair of insulating members disposed in a space intermediate said pole portion and said outer portion of each stator yoke; and, a pair of substantially U-shaped frame members clampingly engaged to said pair of stator yokes on opposing sides thereof, each of said frame members having a pair of side portions extending from a central base portion, each of said side portions having a second through opening formed therein and disposed for axial alignment with a respective one of said pair of first through openings and a second through opening formed in a respective side portion of an other of said pair of substantially U-shaped frame members, each of said side portions having a pair of circular projections formed on opposing sides of said second through opening for engagement with a respective circular recess opening of each of said stator yokes for interlocking said first and second end portions of said pair of stator yokes to form said annular contour of said stator.

* * * * *